Figure 1:
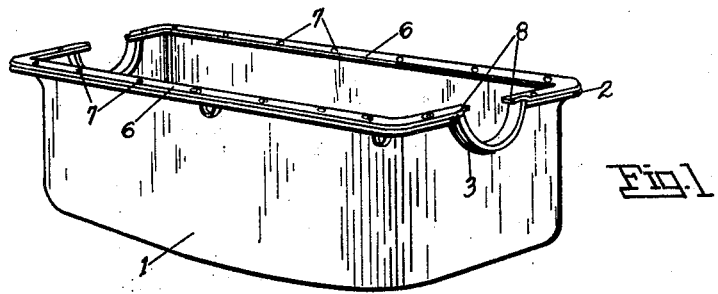

June 9, 1931.  H. D. HUME  1,809,239
ASSEMBLY TOOL
Filed May 18, 1929

Horace D. Hume *Inventor*

By *Herbert E. Smith*
*Attorney*

Patented June 9, 1931

1,809,239

UNITED STATES PATENT OFFICE

HORACE D. HUME, OF GARFIELD, WASHINGTON

ASSEMBLY TOOL

Application filed May 18, 1929. Serial No. 364,097.

My present invention relates to an improved assembly tool designed for use by mechanics and others in the process of replacing the oil pan, or bottom, on the crank case of internal combustion engines. The device of my invention is a hand tool, and a plurality of these tools are employed for temporarily retaining the gasket-sections in position on the top edge of the oil pan as the latter is being attached to the crank case. The primary object of my invention is the provision of a device that is simple in construction, inexpensive in cost of manufacture, and facile in its manipulation in connection with the bolt holes of the oil pan flange and the complementary bolt holes in the gasket sections, with which holes the tools are temporarily employed in retaining the gaskets on the flanges. In many standard types of motors, the gasket located between the bottom edge of the crank case and the top edge of the oil pan, is made up in four sections, and these sections are provided with bolt holes that are designed to register with the bolt holes in the flange of the oil pan. Usually two long U-shaped sections are provided at the sides of the pan, and the respective ends of these sections overlap the upper free ends of the two curved gasket-sections that are fitted in the semi-circular opening in the oil pan to accommodate the crank shaft bearings. The gasket sections, which are fashioned of flexible material such as leather, cork, or other appropriate material are first laid on the top of the flanged oil pan with their bolt holes registering with the bolt holes in the flange of the oil pan, and as these sections are light and consequently easily displaced when the oil pan is being lifted in place, great difficulty is experienced in holding the sections in proper position so that they will be effective when clamped between the oil pan and the crank case.

By the utilization of a number of the tools or devices of my invention, in connection with the bolt holes in the flange and gasket sections, the gasket sections are retained in proper position until the oil pan is ready for bolting to the crank case, and an effective packing gasket is assured after the bolts have been secured.

The invention consists in a novel tool of spring steel in the form of a flat resilient blade fashioned for attachment to the flange of the oil pan, with its ends adapted to pass through the bolt holes of the flange and of the gasket sections, and temporarily retain the sections in proper position during the assembling of the oil pan on the bottom of the crank case.

In the accompanying drawings I have illustrated two forms of the tools, fashioned according to the best modes I have thus far devised for the practical application of the principles of my invention.

Figure 3:
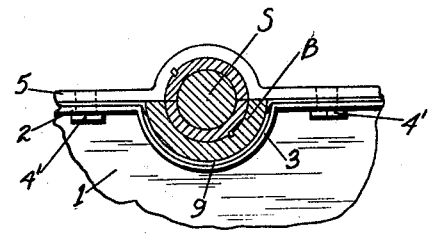
Figure 2:
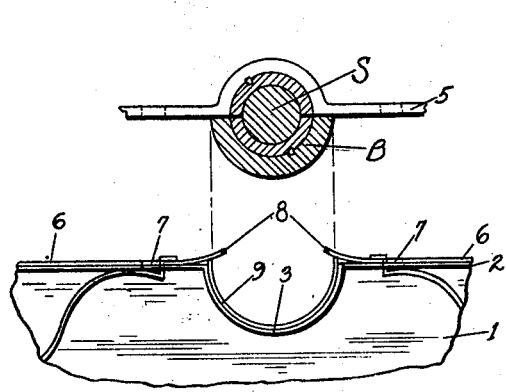

Figure 1 is a perspective view showing a crank-case oil-pan equipped with the gasket sections which are retained in position by the tools of my invention. Figure 2 is an enlarged view showing a portion of an end of the oil pan with the gasket sections thereon and retained by tools of my invention, the pan being in position to be lifted to the crank case, part of which is shown thereabove, together with the crank shaft and bearing in section. Figure 3 illustrates the parts of Figure 2 after the tools have been withdrawn and the pan is bolted in place.

Figure 4:
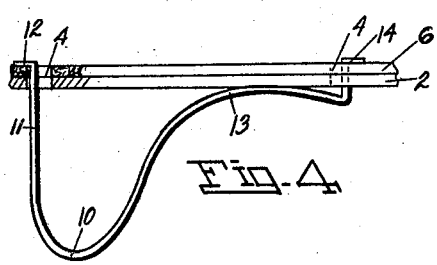
Figure 6:
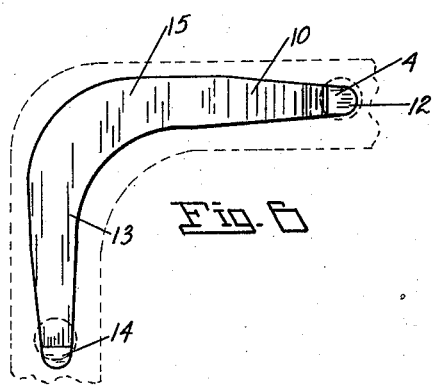
Figure 5:
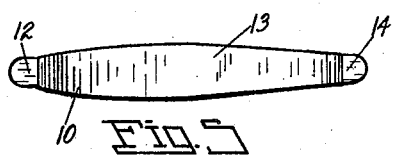

Figure 4 is an enlarged detail view showing one of the tools or resilient clamps in use, parts of the flange and gasket being broken away for convenience of illustration. Figure 5 is a top plan view of the tool of Figure 4. Figure 6 is a top plan view of another form of the tool showing by dotted lines a corner portion of the oil-pan flange, and Figure 7 is an edge view of the tool in Figure 6.

In order that the general arrangement and utility of the tools may be understood I have shown a usual type of oil pan 1 with upper horizontal attaching flanges 2, and end semi-circular flanges 3, the latter for the bearings B of the crank shaft S. The usual bolt holes 4 are provided in the flange 2 and bolts 4' in Figure 3 secure the oil pan to the flange 5 of the crank case or other suitable support.

The packing gasket that is clamped between the pan and the case is made up of sections 6 with bolt holes 7 in them, and the sections 6 are laid on the flange 2 so that their ends 8 will overlap the ends of the sections 9 of the gasket that are laid in the depressions 3 of the crank-case oil pan. The positions of these overlapping ends 8, before and after bolting the oil pan to the crank case, are shown respectively in Figures 2 and 3, and in order that the ends 8 may be folded down over the ends of the sections 9 in a workmanlike manner to insure a packed joint, it is necessary that the sections be maintained in position of Figure 2 while the pan is being introduced to the case. For this purpose, and also to hold the other sections in proper position, the tools of my invention are utilized.

Figure 7:
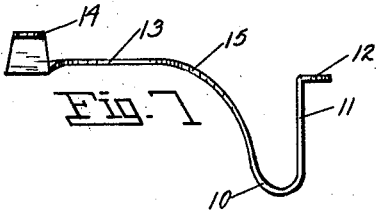

I find it desirable and convenient to utilize a set of tools comprising a plurality of the form shown in Figs. 4–5 and a plurality of the form shown in Figs. 6–7, the former for use along the sides of the pan and the latter especially for use at the end corners of the pan. Both forms of device or tool are utilized in connection with the holes 4 of the flange and the holes 7 of the gasket for retaining the latter in close relation to and upon the top face of the oil pan flange as the oil pan is being lifted to the crank case.

The tool in Figures 4 and 5 is fashioned from a strip of spring steel to a special shape whereby the resiliency or elasticity of the metal is utilized in clamping the tool in position. The tool is formed with a bow 10, a straight arm 11, and an angular hook 12, the latter designed to pass through the bolt holes 4 and 7. The bow merges into an inward curve 13 that terminates in an L-shaped hook 14 of suitable dimensions so that it may pass through the bolt holes 4 and 7. The curved portion 13 forms an intermediate fulcrum-spring that tends to draw downwardly the two L-shaped hooks and by these hooks the gasket is held on the flange. The spring bow 10 tends to force the hook 12 from the fulcrum-spring thus frictionally engaging the hooks with the walls of the bolt holes through which they pass, to prevent displacement of the tool. The heads of the hooks 12 and 14 are thin as shown and the hooks may readily be withdrawn from the holes by pressing the hooks toward one another in Figure 4 and then pulling them freely through the holes 7 and 4. When the clamp or tool is being applied, the hooks are pressed toward one another and in this position passed through the bolt holes, and then the hooks are freed to snap into proper position.

In Figures 6 and 7 the tool is of angular shape for use at the corners of the oil pan flange, and the body 15 is provided with the bow 10, straight arm 11 and hook 12 at one end, and with the fulcrum-spring 13 and L-hook 14 at its other end, the hooks 12 and 14 being used in the same manner as those corresponding thereto in Figures 4 and 5.

After the pan has been suspended from the case by a suitable number of bolts 4', which bolts of course pass through the bolt holes not occupied by the hooks, the bolts may be tightened until it becomes necessary to disengage the clamps or tools, then after the clamps have been withdrawn, the bolts are turned home and the gasket is clamped between adjoining parts.

Having thus fully described my invention, what I claim as new and desire to secure by Letters Patent is:—

1. An assembly tool of resilient metal having a pair of spaced outwardly extending end hooks, and a bow and fulcrum spring intermediate the hooks.

2. An integral assembly tool of spring metal having a pair of spaced retaining and attaching hooks and fashioned with intermediate portions for frictional contact with the work whereby the tool is held against displacement.

3. A one piece assembly tool of resilient metal having out-turned end hooks and fashioned with an intermediate bow and inwardly curved fulcrum portion.

4. An assembly tool of resilient metal having L-shaped outwardly turned end hooks and fashioned with an intermediate bow and reversely curved fulcrum portion.

In testimony whereof I affix my signature.

HORACE. D. HUME.